(12) United States Patent
Chen et al.

(10) Patent No.: US 8,189,130 B2
(45) Date of Patent: May 29, 2012

(54) ARRAY SUBSTRATE, LIQUID CRYSTAL DISPLAY PANEL AND METHOD FOR MANUFACTURING THE SAME

(75) Inventors: Yu-Cheng Chen, Hsin-Chu (TW); Tsan-Chun Wang, Hsin-Chu (TW); Maw-Song Chen, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 363 days.

(21) Appl. No.: 12/647,300

(22) Filed: Dec. 24, 2009

(65) Prior Publication Data

US 2010/0296016 A1 Nov. 25, 2010

(30) Foreign Application Priority Data

May 22, 2009 (TW) ................................ 98117161 A (51) Int. Cl.
*G02F 1/1343* (2006.01)

(52) U.S. Cl. ............................................ 349/38; 349/39
(58) Field of Classification Search ........................ None
See application file for complete search history.

(56) References Cited

U.S. PATENT DOCUMENTS

| 7,365,825 | B2 | 4/2008 | Kim | |
|---|---|---|---|---|
| 2009/0195723 | A1* | 8/2009 | Araki et al. | 349/43 |

* cited by examiner

*Primary Examiner* — Thanh-Nhan P. Nguyen
(74) *Attorney, Agent, or Firm* — Rabin & Berdo, PC (57) ABSTRACT

An active array substrate, a liquid crystal display panel and a method for manufacturing the active array substrate are provided. The active array substrate includes a base, scan lines, data lines and gate tracking lines disposed on the base. Each of the gate tracking lines has first portions, auxiliary portions and junction portions, wherein the junction portion and the first portion are formed in different layers. One of the junction portions is electrically connected with corresponding one of the first portions.

17 Claims, 11 Drawing Sheets

ARRAY SUBSTRATE, LIQUID CRYSTAL DISPLAY PANEL AND METHOD FOR MANUFACTURING THE SAME

This application claims the benefit of Taiwan Patent Application Serial No. 98117161, filed May 22, 2009, the subject matter of which is incorporated herein by reference.

BACKGROUND OF THE INVENTION

1. Field of the Invention

The present invention generally relates to an active array substrate, a liquid crystal display panel and method for manufacturing the same, especially relating to a liquid crystal display panel which displays uniform images and has thin edges.

2. Description of Related Art

Flat panel displays are popular nowadays because of light weight, power saving and low radiation, therefore, they are commonly used for desktops, mobile phones, personal digital assistants and TVs. In liquid crystal display, by changing the electric field within the liquid crystal layer to control the arrangements of the liquid crystal molecules to changing the transmission characteristics of the liquid crystal layer and incorporated with the light provided from the backlight module so as to display images.

Figure 1:
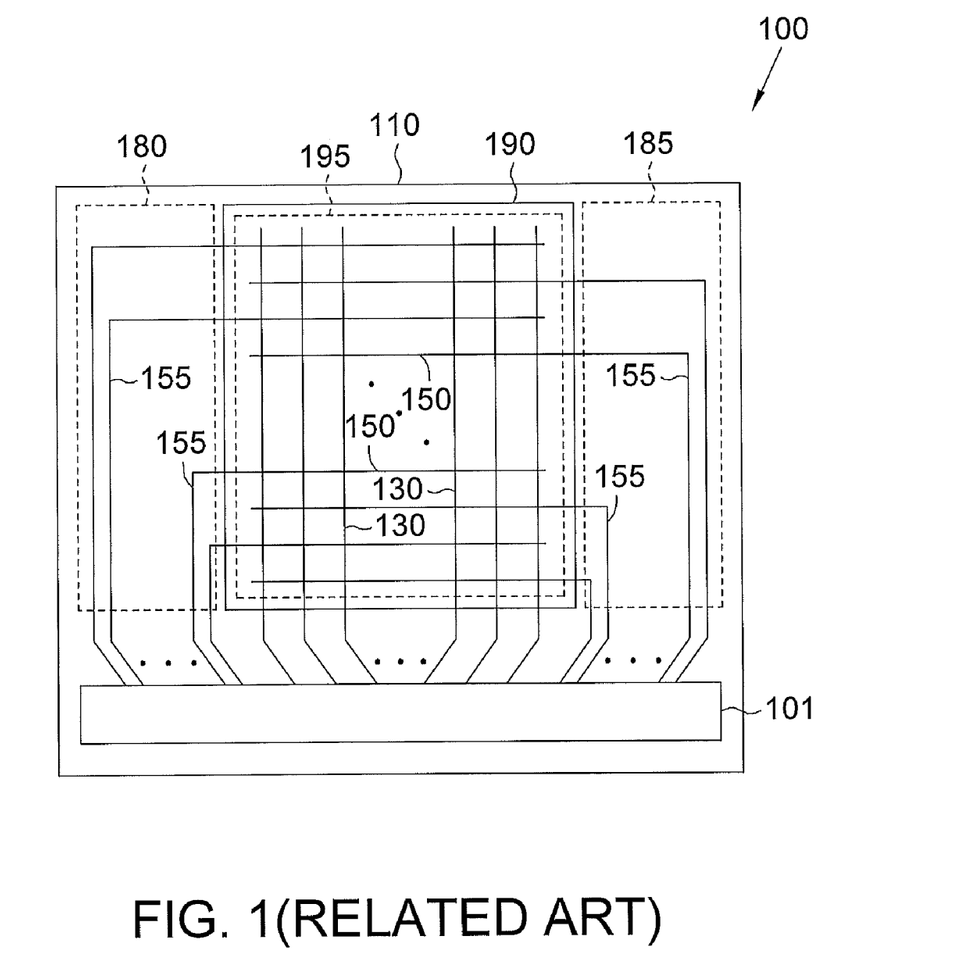
FIG. 1 is a perspective view of a conventional active array substrate.

FIG. 1 shows a conventional liquid crystal display panel. Liquid crystal display panel 100 includes active array substrate 110, opposite substrate 190, and liquid crystal layer (not shown) sealed between the active array substrate 110 and the opposite substrate 190. The opposite substrate may be color filter. The active array substrate 110 includes data lines 130, scan lines 150, auxiliary gate lines 155, first edge area 180, second edge area 185, image display area 195 and driving module 101. The data lines 130 and the scan lines 150 are located in the image display area 195. The auxiliary gate lines 155 are located in the first edge area 180 and the second edge area 185. The driving module 101 is electrically connected with the auxiliary gate lines 155 to transmit the gate signals to the scan lines 150 via the auxiliary gate lines 155. The driving module 101 is further electrically connected with the data lines 130 to transmit the data signals to the pixel units (not shown) via the data lines 130. Images on the liquid crystal display panel 100 are displayed according to data signals provided to the pixel units control by the gate signals.

In conventional active array substrate 110, number of the auxiliary gate lines 155 is equal to that of the scan lines 150, so the first edge area 180 and the second edge area 185 are provided wide for the auxiliary gate lines 155 located therein. However, due to the small size of the portable display device, it is important to study how to shorten the edge areas in order to get smaller size displays.

Active array substrate 110 is mainly formed of many conducting layers and insulating layers. Scan lines 150, gates and common lines (not shown) are formed in a same layer (M1). Data lines 130 are formed by another layer (M2). Pixel electrodes are formed by a transparent conducting layer. In layout, because of the wires design or any unavoidable reasons, small distance (horizontal or vertical) among the conducting lines influences the signals transmitted therein so that loading effect occurs. When loading effect generated non-uniformly among the pixels and function of each pixel may not be equal, therefore, the image quality is seriously influenced.

SUMMARY OF THE INVENTION

Accordingly, the present invention is directed to a liquid crystal display panel with uniform images.

An objective of the present invention is to provide an active array substrate including a base, scan lines, data lines, and gate tracking lines. Scan lines are substantially perpendicular to the data lines. Each gate tracking line is electrically connected with corresponding scan line. Each gate tracking line includes first portions, auxiliary portions, and junction portions. Auxiliary portions are electrically connected with corresponding first portions, respectively. Junction portions and first portions are formed in different layers. One of the junction portions is electrically connected with corresponding first portion through corresponding via hole.

Active array substrate according to the present invention further includes active devices, pixel electrodes and common lines. Each active device is electrically connected with corresponding data line. Each pixel electrode is electrically connected with corresponding active device. Common lines are disposed on the base and substantially parallel with the scan lines, and each and a drain of the corresponding active device form a storage capacitor.

In accordance with the above objectives and other objectives, the gate tracking line of the active array substrate according to the present invention further has an auxiliary insulating layer located between the first portion and one of the data lines.

In accordance with the above objectives and other objectives, the gate tracking line of the active array substrate according to the present invention further has an auxiliary semiconductor layer located between the auxiliary insulating layer and the data lines.

In accordance with the above objectives and other objectives, the present invention provides a method for manufacturing an active array substrate. The method includes providing a base; forming a first conducting layer on the base; patterning the first conducting layer to form a plurality of scan lines, a plurality of gates, a plurality of first portions and a plurality of auxiliary portions corresponding to the plurality of first portions, respectively; forming a gate insulating layer on the scan lines, the gates and the first portions; forming a semiconductor layer on the gate insulating layer; patterning the semiconductor layer to form a plurality of channel layers above the corresponding gates, respectively; patterning the gate insulating layer to form a plurality of via holes to expose the auxiliary portions, respectively; forming a second conducting layer on the semiconductor layer; patterning the second conducting layer to form a plurality of data lines, a plurality of sources and drains, and a plurality of junction portions, wherein each of the junction portions is electrically connected with corresponding auxiliary portion through the corresponding via hole; forming a passivation layer overall; patterning the passivation layer to form a plurality of contact holes to expose corresponding drains, respectively; and forming a plurality of pixel electrodes on the passivation layer and electrically connected with corresponding drains through the corresponding contact holes, respectively.

In accordance with the above objectives and other objectives, the present invention provides a liquid crystal display panel. The liquid crystal display panel includes the active array substrate illustrated above, opposite substrate and liquid crystal layer disposed between the active array substrate and the opposite substrate.

In accordance with the above objectives and other objectives, the present invention provides an active array substrate having thin edge or non-edge and a method for manufacturing the same.

In accordance with the above objectives and other objectives, the present invention provides an active array substrate having low loading effect and a method for manufacturing the same.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

The illustration of the embodiments of the present invention is incorporated with Taiwan Patent Application No. 98100467 for reference.

First Embodiment

FIGS. 2A to 2G show the processes of the method for manufacturing the active array substrate according to the first embodiment of the present invention.

Figure 2A:
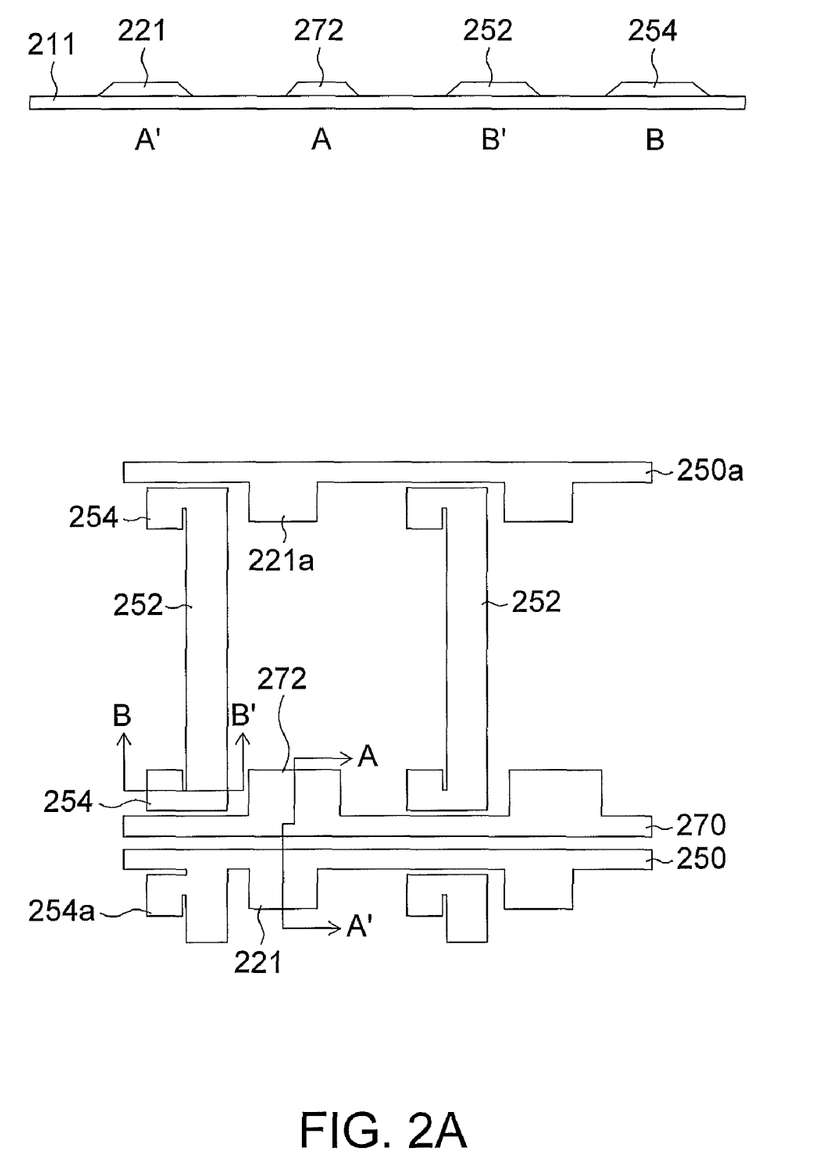
FIGS. 2A to 2G show processes of a method for manufacturing the active array substrate according to the first embodiment of the present invention.

In FIG. 2A, provide base 211. Form first conducting layer (not marked) on the base 211. Pattern the first conducting layer to form scan lines 250, 250a, gates 221, 221a, common lines 270, capacitor lower electrodes 272, first portion 252, and auxiliary portions 254 connected with two ends of the first portion 252, respectively. The method of patterning the first conducting layer may be conventional expose-develop-etching process, for example. Auxiliary portion 254 is connected with the first portion 252 for example, for a one single pixel unit. Two ends of the first portion 252 may be connected with two auxiliary portions 254, respectively, i.e. first portion 252 and the two auxiliary portions 254 substantially form an "inverse C" shaped or an "I" shaped, but not limited thereto. Capacitor lower electrode 272 is connected with the common line 270.

Refer to top view and cross section views along line A-A' and B-B' of FIG. 2A. The gate 221 or 221a corresponds to the active device of the pixel unit. The active device may be a thin film transistor, for example. The capacitor lower electrode 272 is in and corresponds to a storage capacitor location. As for the cross section along line B-B', the first portion 252 and the auxiliary portion 254 are part of the gate tracking line (not marked). Because each gate tracking line of the pixel unit has to be electrically connected with the corresponding scan line 250a, the gate 221a will be designed to be electrically connected with the first portion 252 or the auxiliary portion 254 while the first conducting layer is patterned as shown in FIG. 2A.

Figure 2B:
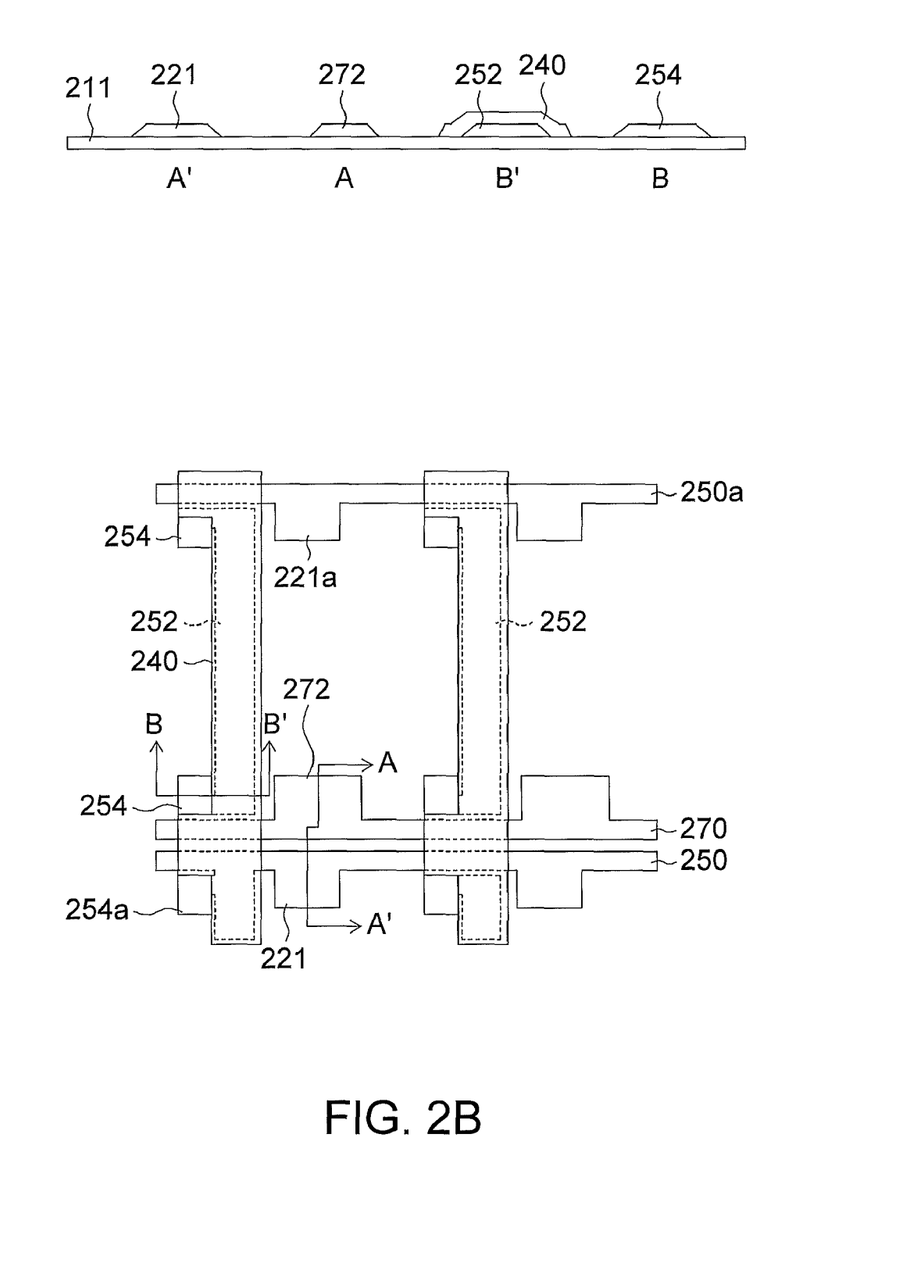

In FIG. 2B, form auxiliary insulating layer 240 on the first portion 252 and covering at least a portion of the scan lines 250, 250a, the common lines 270 and/or the auxiliary portion 254. For example, the auxiliary insulating layer 240 may be formed to completely cover the first portion 252. The material of the auxiliary insulating layer 240 may be inorganic or organic, for example. The inorganic material may be silicon nitride or silicon oxide, for example. However, the auxiliary insulating layer 240 may not be formed, but not limited herein.

Figure 2C:
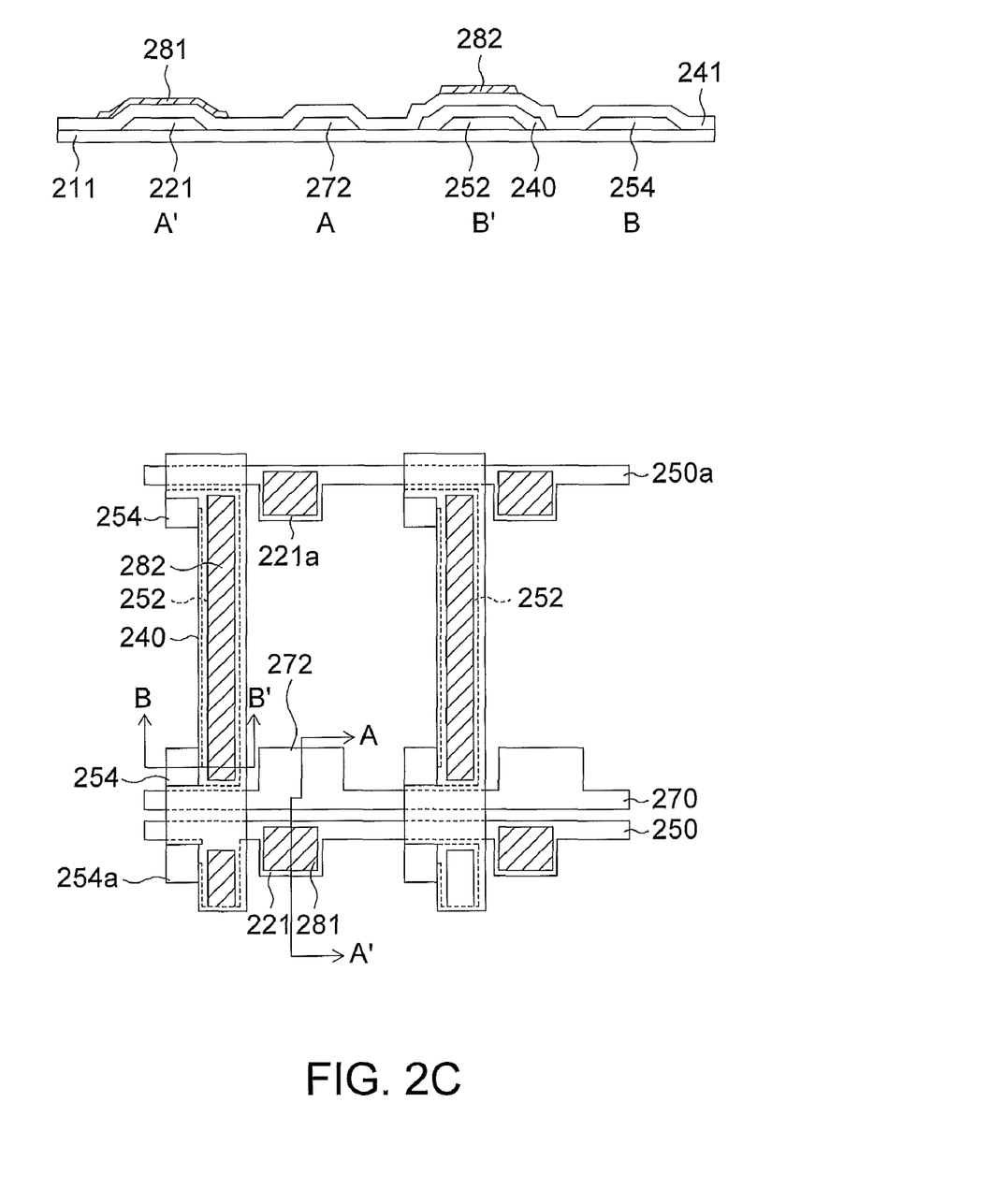

In FIG. 2C, form gate insulating layer 241 overall to cover elements shown above. For convenience and easy to observe, the gate insulating layer 241 is not shown in the top view of FIG. 2C. Then, form semiconductor layer (not marked) on the gate insulating layer 241. Thereafter, pattern the semiconductor layer to form channel layer 281 and auxiliary semiconductor layer 282. The method of patterning may be conventional expose-develop-etching process, for example. Specifically, the channel layer 281 is vertically located above the gate 221 to constitute a portion of the thin film transistor. The auxiliary semiconductor layer 282 is located vertically above the first portion 252 and the auxiliary insulating layer 240 to constitute a portion of the gate tracking line.

Figure 2D:
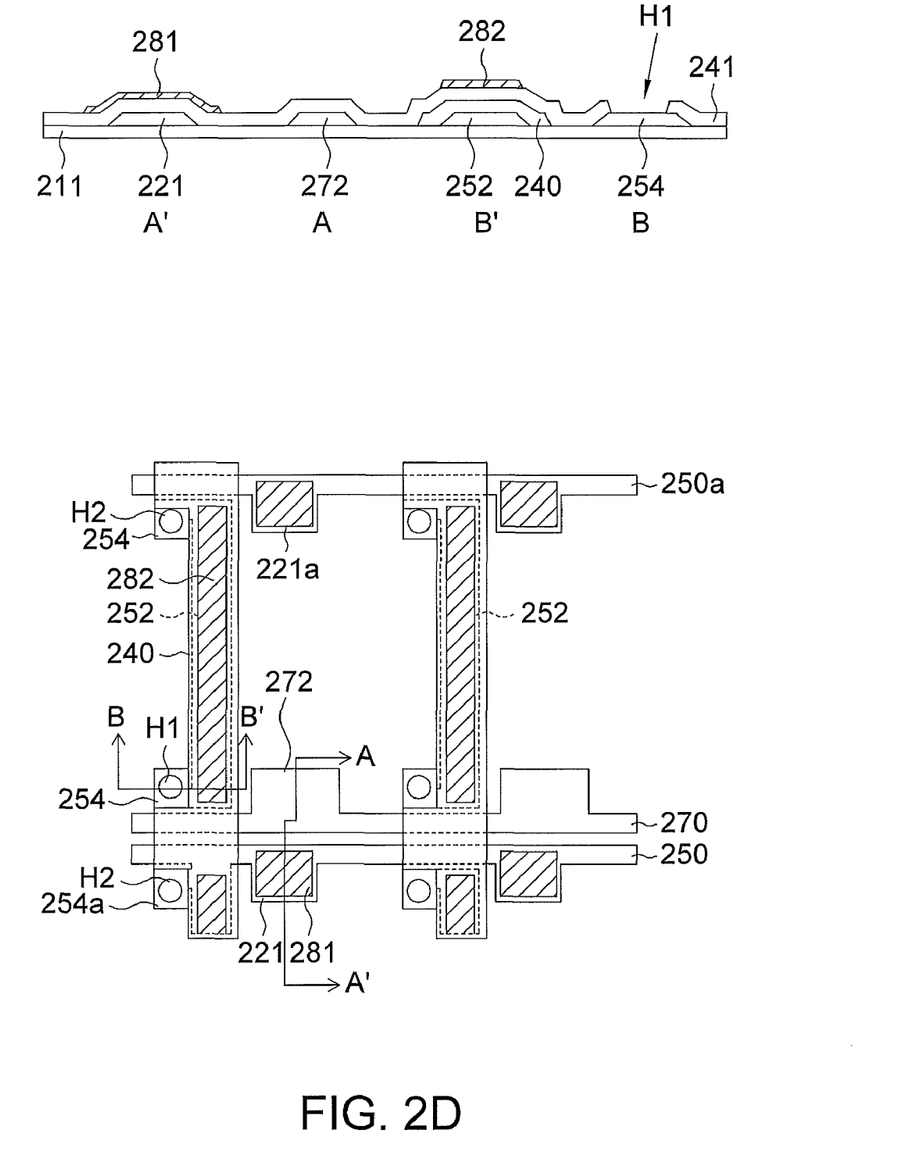

Next, in FIG. 2D, pattern the gate insulating layer 241 to form via holes H1 and H2 substantially located vertically above the auxiliary portions 254, respectively. For one single pixel unit, the gate insulating layer 241 above the two auxiliary portions 254 has via holes H1 and H2 to expose the two auxiliary portions 254, respectively.

Figure 2E:
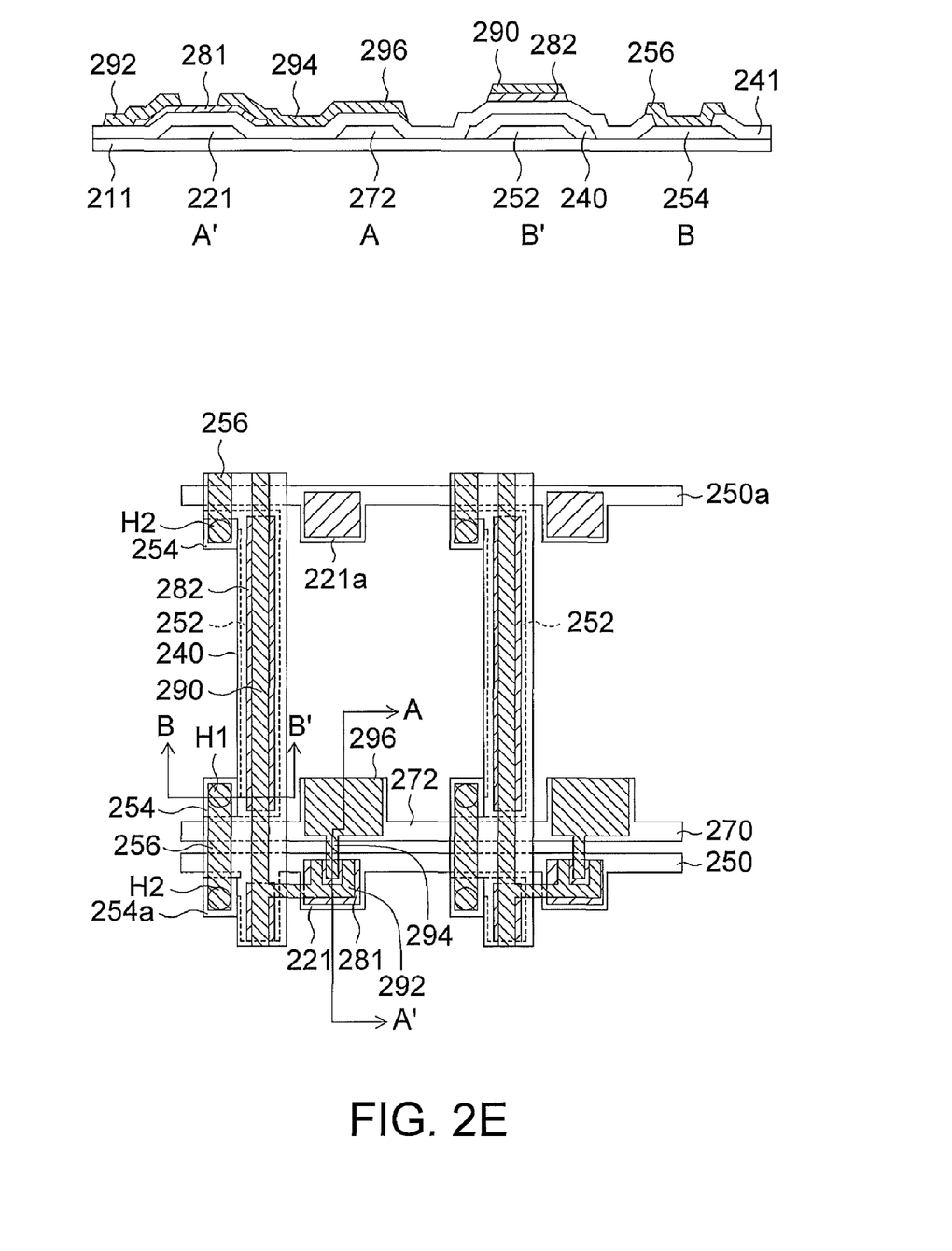

In FIG. 2E, form second conducting layer (not marked) overall to cover the elements shown above. Pattern the second conducting layer to form data lines 290, sources 292, drains 294, capacitor upper electrodes 296 and junction portions 256. The via holes H1 and H2 are not overlapped with the data lines 290. The gate tracking lines are substantially parallel to the plurality of data lines 290, and electrically connected with corresponding scan lines 250, respectively. The data line 290 is located vertically above the first portions 252, for example. The method of patterning may be conventional expose-develop-etching process, for example. Specifically, data lines 290 are substantially perpendicular to the common lines 270 and scan lines 250, for example. Because junction portion 256 is located above the auxiliary portions 254 and electrically connected with the auxiliary portions 254 through via holes H1 and H2, single junction portion 256 can be electrically connected with two auxiliary portions 254 of two adjacent pixel units. As a result, a gate tracking line is completely formed. Single gate tracking line has first portions 252, auxiliary portions 254 and junction portions 256. Selectively, the gate tracking line may further include auxiliary insulating layer 240 and/or auxiliary semiconductor layer 282.

Figure 2F:
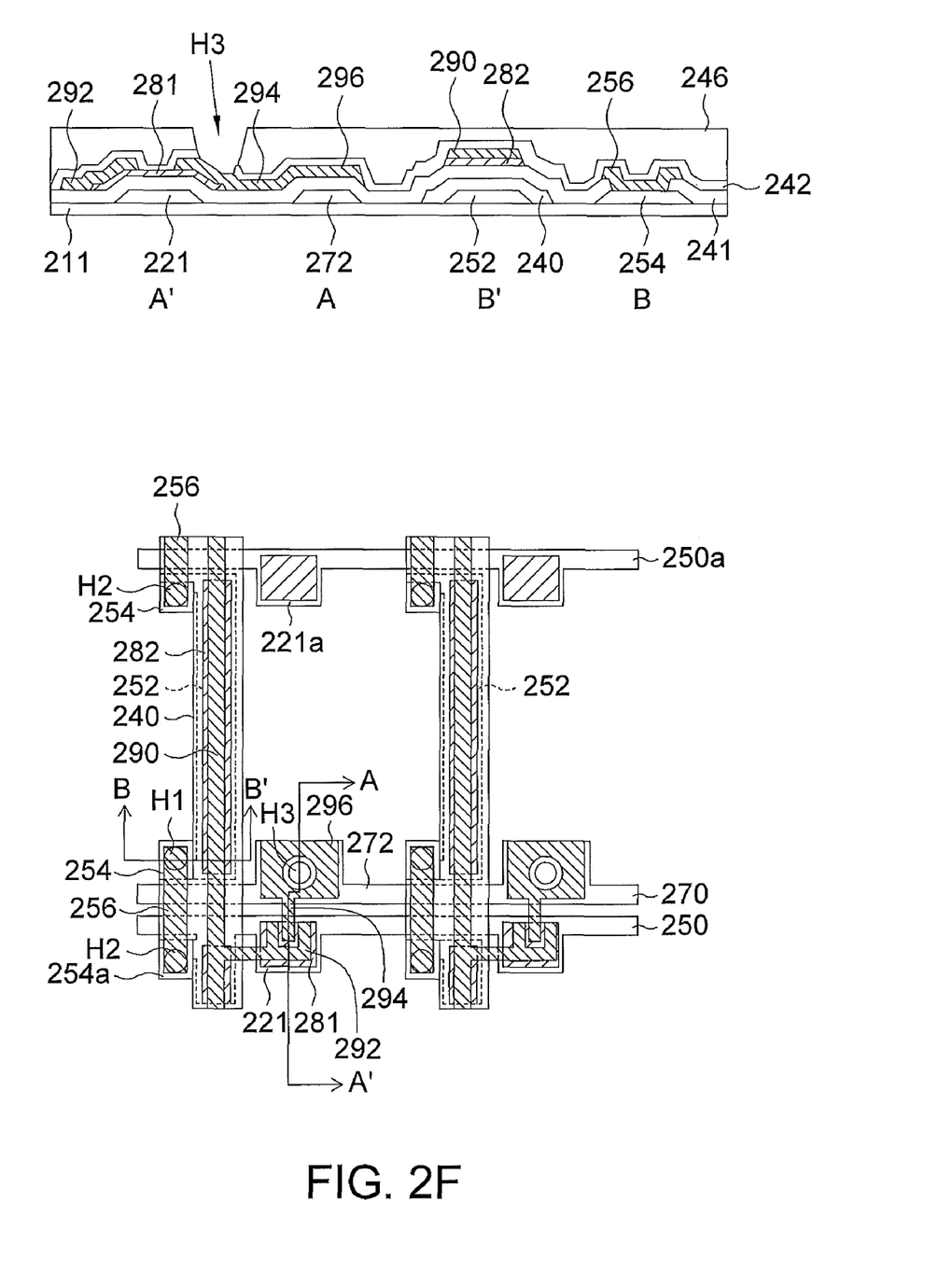

In FIG. 2F, form first passivation layer 242 and/or second passivation layer 246 overall to cover the elements shown above. Then, pattern the first passivation layer 242 and/or the second passivation layer 246 to form contact holes H3 to expose drain 294. One or both of the first passivation layer 242 and the second passivation layer 246 may be formed selectively, but not limited thereto. The material of the first passivation layer 242 and/or the second passivation layer 246 may be organic or inorganic, for example.

Figure 2G:
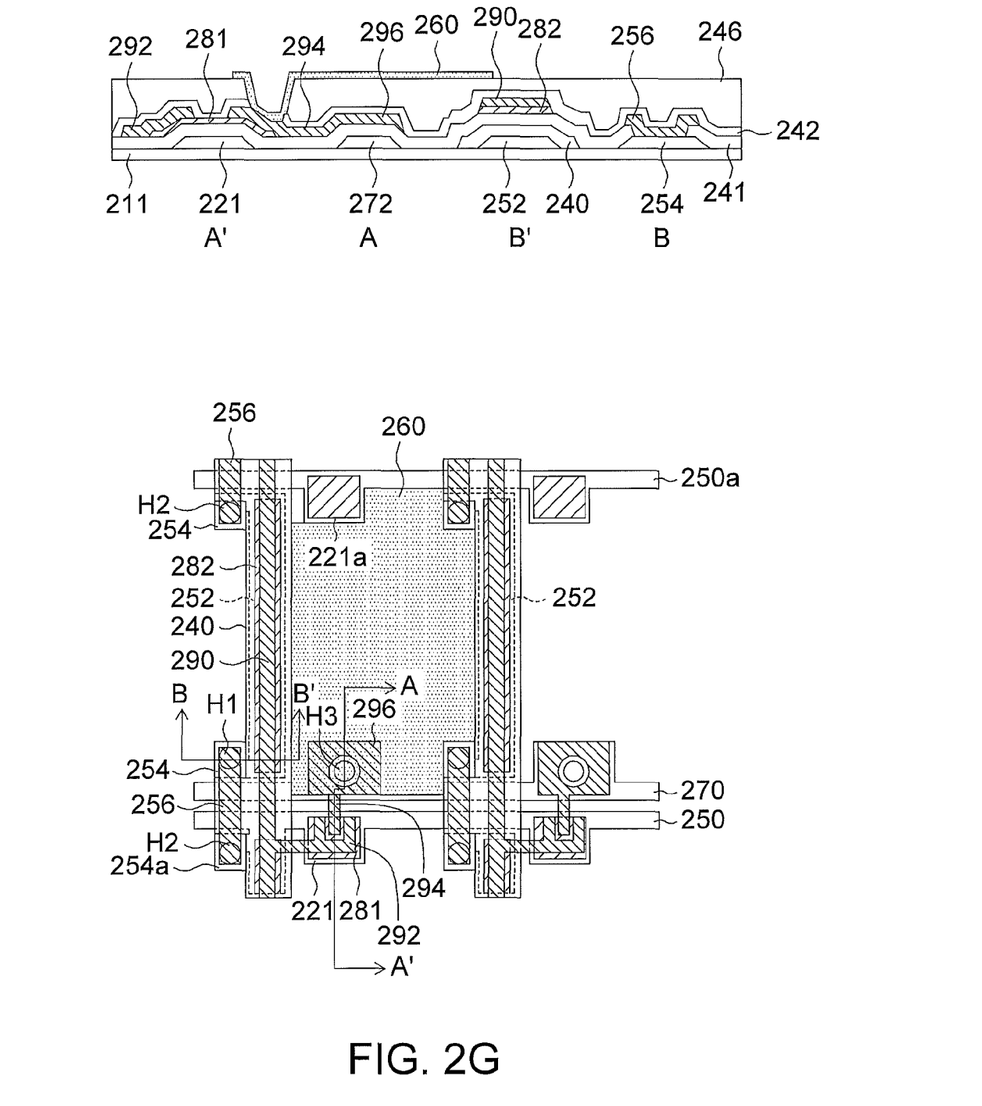

Finally, in FIG. 2G, form pixel electrodes 260 corresponding to pixel units, respectively. The active array substrate according to the present embodiment is completed. The material of the pixel electrode 260 may be reflective metal or transparent conducting metal oxide. The active array substrate includes base 211, scan lines 250, common lines 270, data lines 290, gate tracking lines, active devices and pixel electrodes 260. Each gate tracking line has first portions 252, auxiliary portions 254, via holes H1, H2, and junction portions 256. The junction portions 256 and the first portions 252 are formed in different layers. One of the junction portions 256 is electrically connected with the corresponding first portion 252 through the via holes H1, H2. A portion of the first portions 252 and the data lines 290 are overlapped with each other, for example. The junction portions 256 and the data lines 290 are formed in a same layer, for example. Each gate tracking line further has auxiliary insulating layer 240 between the first portions 252 and one of the data lines 290. Each gate tracking line may further have auxiliary semiconductor layer 282 located between the auxiliary insulating layer 240 and one of the data lines 290. The via holes H1, H2 and the data lines 290 are not overlapped. Each active device is electrically connected with corresponding data line 290 and scan line 250. Each pixel electrode 260 is electrically connected with corresponding drain of the active device. Common lines 270 are substantially parallel with the scan lines 250 and incorporated with the capacitor upper electrode 296 to form storage capacitor.

Specifically, because of the auxiliary insulating layer 240 and the auxiliary semiconductor layer 282, the loading effect between the first portion 252 and the data line 290 can be lowered. Besides, first portions 252 are substantially shielded by the data lines 290 so that the aperture ratio would not be decreased. Because of the gate tracking lines, the auxiliary gate lines 155 located in the first edge area 180 and/or the second edge area 185 may be reduced or omitted, as a result, the object of thin edge of non-edge can be achieved.

Second Embodiment

Figure 3:
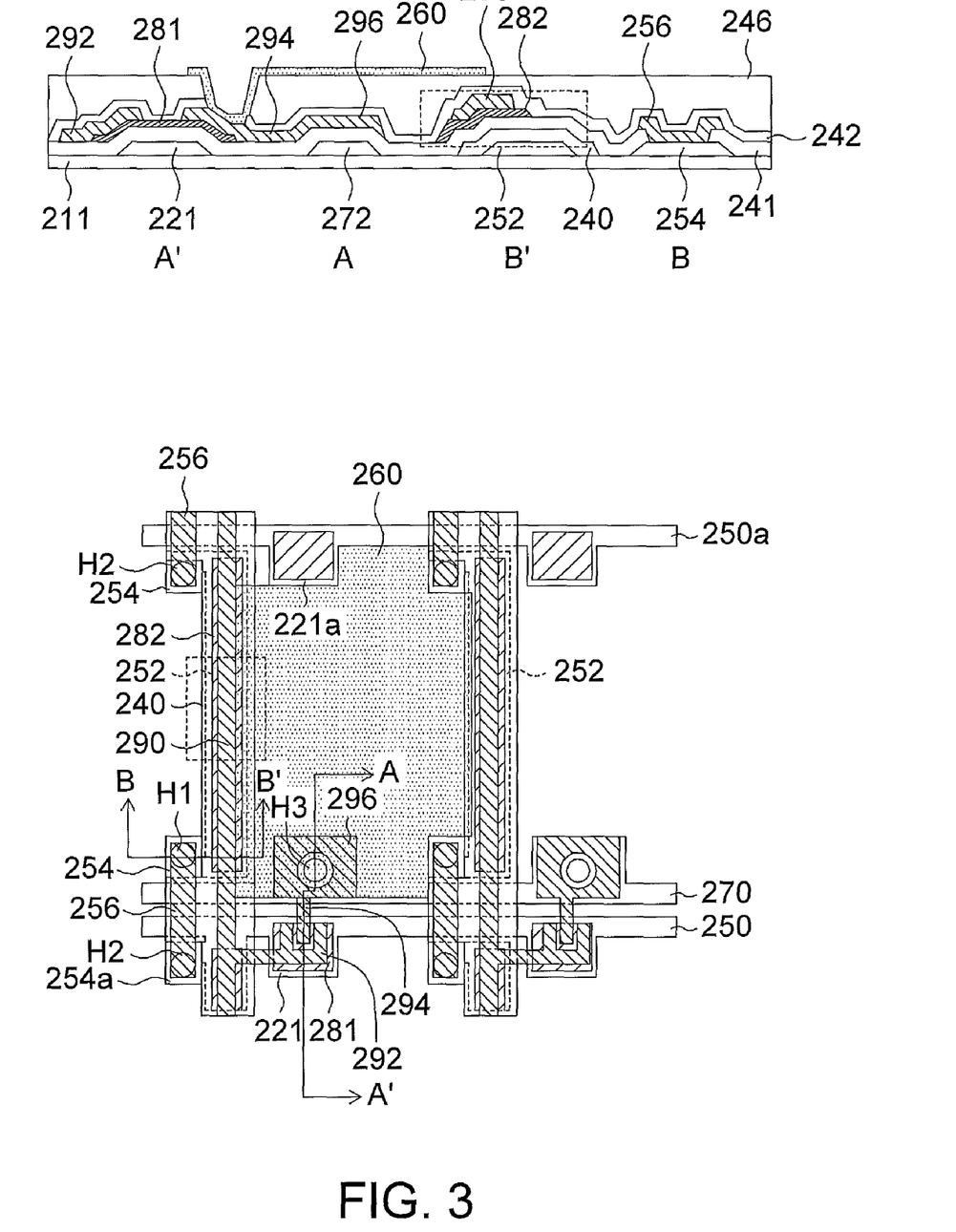
FIG. 3 is the active array substrate according to the second embodiment of the present invention.

FIG. 3 is the active array substrate according to the second embodiment of the present invention.

In FIG. 3, compared with the first embodiment, only part of the auxiliary semiconductor layer 282 and data line 290 are overlapped with the first portion 252 so that the loading effect can be reduced. Other elements and steps of the manufacturing method are similar or identical to that of the first embodiment. Detail illustration is omitted for convenience.

Third Embodiment

Figure 4:
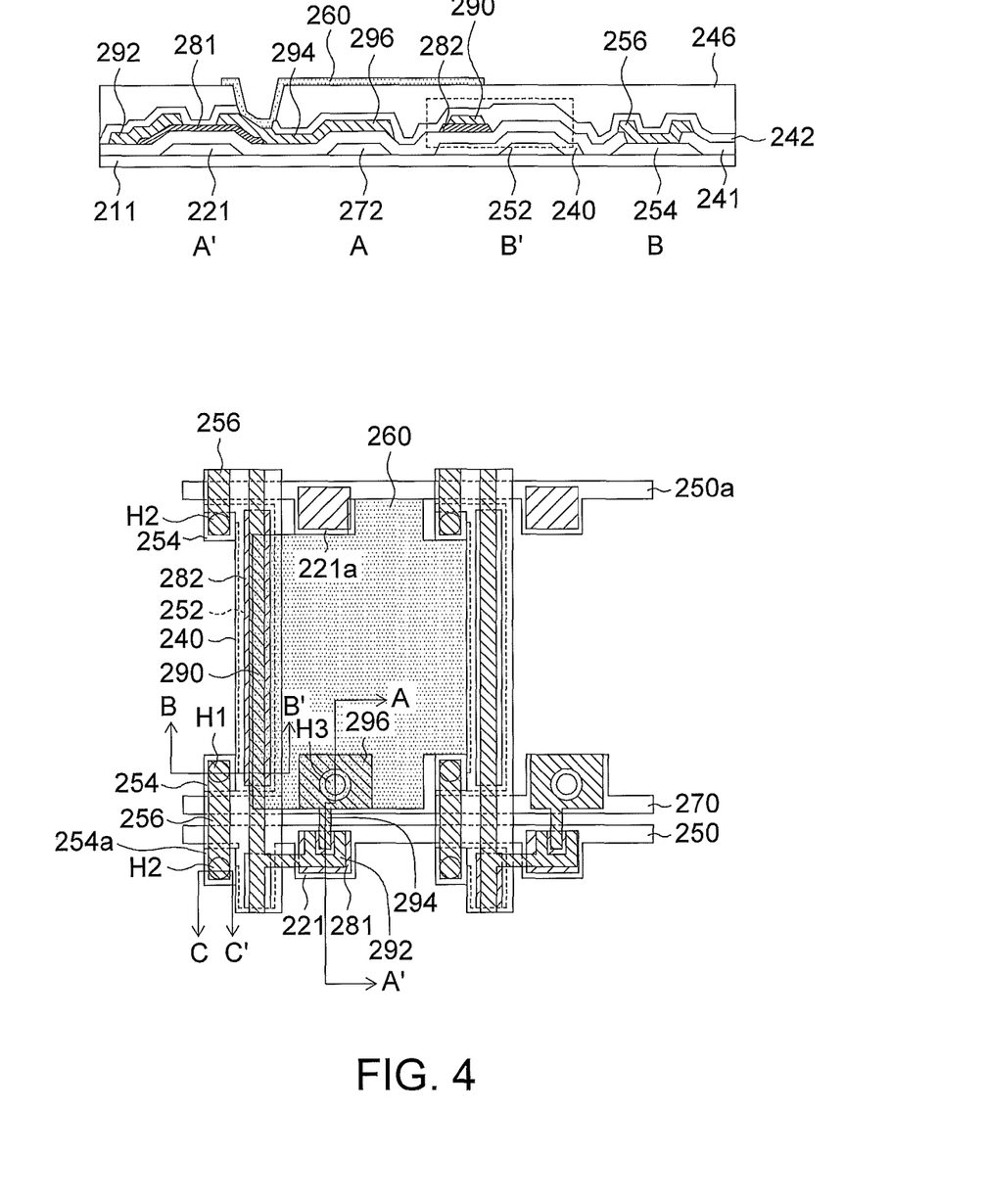
FIG. 4 is the active array substrate according to the third embodiment of the present invention.

FIG. 4 is the active array substrate according to the third embodiment of the present invention.

In FIG. 4, compared with the first embodiment, the auxiliary semiconductor layer 282 and data line 290 are located bias and completely not overlapped so that the loading effect can be efficiently reduced. Other elements and steps of the manufacturing method are similar or identical to that of the first embodiment. Detail illustration is omitted for convenience.

Figure 5:
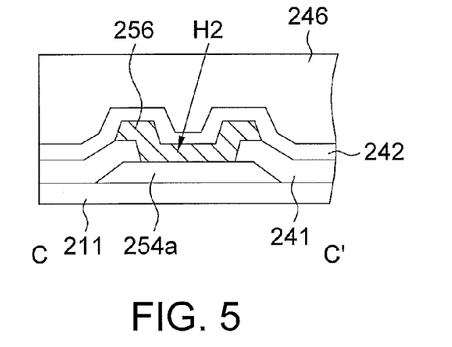
FIG. 5 is the enlarged cross section view along the line C-C' of FIG. 4.

FIG. 5 show the enlarged cross section view along the line C-C' of FIG. 4. In FIG. 5, the gate tracking line is electrically connected with the corresponding scan line 250 through the via hole H2. Specifically, junction portion 256 of the gate tracking line is electrically connected with auxiliary portions 254a which is connected with corresponding scan line 250. As shown in FIG. 2A, scan line 250 and auxiliary portions 254a are connected and may be formed in a same layer. Thereby, the gate tracking line is electrically connected with the corresponding scan line 250.

Fourth Embodiment

Figure 6:
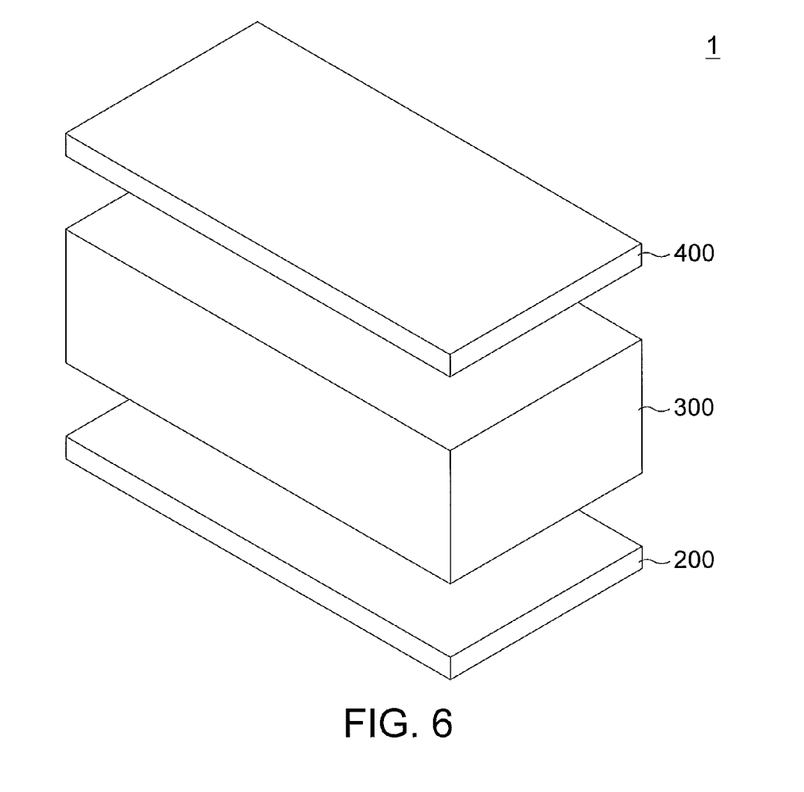
FIG. 6 is the liquid crystal display panel according to the present invention.

As shown in FIG. 6, liquid crystal display panel 1 includes any of the active array substrates 200 of the embodiments above, opposite substrate 400 and liquid crystal layer 300. Liquid crystal layer 300 is disposed between the active array substrate 200 and the opposite substrate 400. The opposite substrate 400 may be color filter substrate or common electrode substrate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active array substrate, comprising:
   a base;
   a plurality of scan lines disposed on the base;
   a plurality of data lines disposed on the base; and
   a plurality of gate tracking lines disposed on the base and electrically connected with the corresponding scan lines respectively, each including:
      a plurality of first portions;
      a plurality of auxiliary portions electrically connected with the corresponding first portions, respectively; and
      a plurality junction portions, wherein each one of the junction portions is electrically connected with the corresponding first portion through one of the auxiliary portions and wherein the junction portions and the first portions are formed in different layers.

2. The active array substrate according to claim 1, wherein a portion of the first portion is overlapped with the data line.

3. The active array substrate according to claim 1, wherein the junction portions and the data lines are formed in a same layer.

4. The active array substrate according to claim 1, wherein each of the gate tracking lines further has an auxiliary insulating layer located between the first portion and the data line.

5. The active array substrate according to claim 4, wherein the gate tracking line further has an auxiliary semiconductor layer located between the auxiliary insulating layer and the data line.

6. The active array substrate according to claim 1, wherein the auxiliary portions of the gate tracking lines are not overlapped with the data lines.

7. The active array substrate according to claim 1, further comprising:
   a plurality of active devices, each electrically connected with corresponding data line and scan line;
   a plurality of pixel electrodes, each electrically connected with corresponding active device; and
   a plurality of common lines disposed on the base, wherein each of the common lines and a drain electrode of the corresponding active device form a storage capacitor.

8. The active array substrate according to claim 1, wherein the first portion and the data line are overlapped with each other.

9. The active array substrate according to claim 1, wherein the first portion and the data line are not overlapped.

10. The active array substrate according to claim 1, wherein each of the gate tracking lines further has an auxiliary semiconductor layer located between the first portion and one of the data lines.

11. A liquid crystal display, comprising:
an active array substrate, comprising:
- a base;
- a plurality of scan lines disposed on the base;
- a plurality of data lines disposed on the base; and
- a plurality of gate tracking lines disposed on the base and electrically connected with the corresponding scan lines respectively, each including:
  - a plurality of first portions;
  - a plurality of auxiliary portions electrically connected with the corresponding first portion, respectively; and;
  - a plurality junction portions, wherein each one of the junction portions is electrically connected with the corresponding first portion through one of the auxiliary portions and wherein the junction portions and the first portions are formed in different layers;
an opposite substrate; and
a liquid crystal layer disposed between the active array substrate and the opposite substrate.

12. A method for manufacturing an active array substrate, comprising:
providing a base;
forming a first conducting layer on the base;
patterning the first conducting layer to form a plurality of scan lines, a plurality of gate electrodes, a plurality of first portions and a plurality of auxiliary portions connecting to the plurality of first portions, respectively;
forming a gate insulating layer on the scan lines, the gate electrodes, the first portions and the auxiliary portions;
forming a semiconductor layer on the gate insulating layer;
patterning the semiconductor layer to form a plurality of channel layers above the corresponding gate electrodes, respectively;
patterning the gate insulating layer to form a plurality of via holes to expose the auxiliary portions, respectively;
forming a second conducting layer on the semiconductor layer;
patterning the second conducting layer to form a plurality of data lines, a plurality of source electrodes and drain electrodes, and a plurality of junction portions, wherein each of the junction portions is electrically connected with corresponding auxiliary portion through the corresponding via hole;
forming a passivation layer overall;
patterning the passivation layer to form a plurality of contact holes to expose corresponding drain electrodes, respectively; and
forming a plurality of pixel electrodes on the passivation layer and electrically connected with corresponding drain electrodes through the corresponding contact holes, respectively.

13. The method according to claim 12, wherein the step of patterning the semiconductor layer further comprises patterning the semiconductor layer to form a plurality of auxiliary semiconductor layers on the corresponding first portions, respectively.

14. The method according to claim 12, further comprising forming an auxiliary insulating layer on the first portions before the step of forming the gate insulating layer.

15. The method according to claim 12, wherein the step of patterning the first conducting layer further comprises patterning the first conducting layer to form a plurality of common lines.

16. The method according to claim 12, wherein the first portion and the corresponding data line are parallel to each other and at least part of the data line is overlapped with the first portion.

17. The method according to claim 12, wherein the first portion and the corresponding data line are parallel to each other and not overlapped.

* * * * *